L. P. KEECH.
Temporary-Binders.
No. 156,887. Patented Nov. 17, 1874.
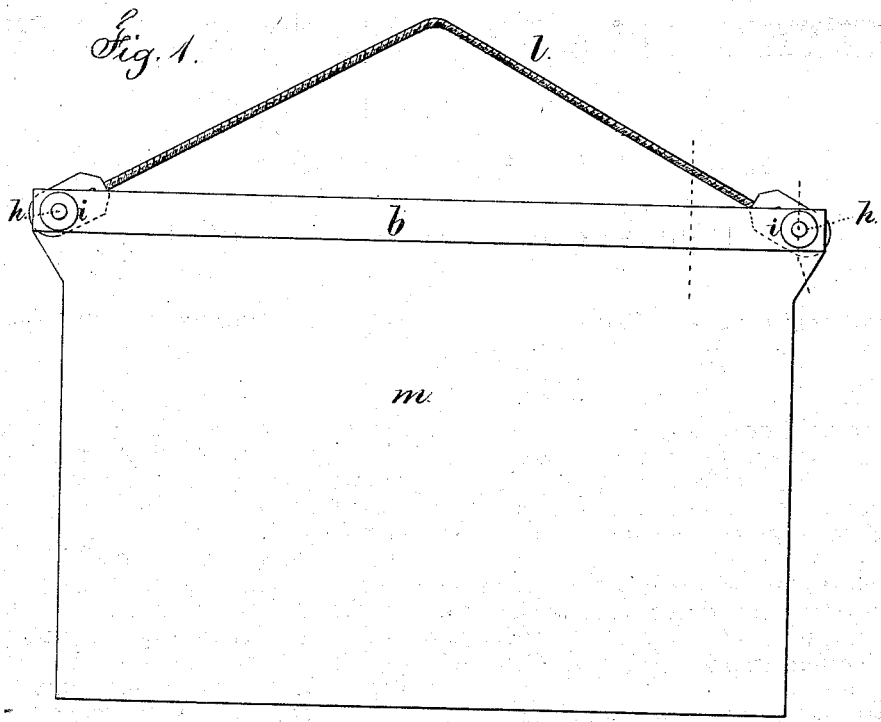
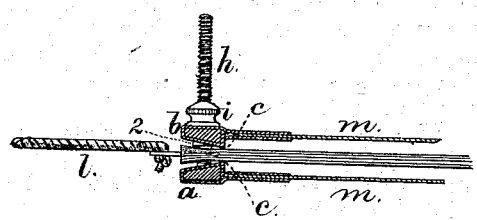
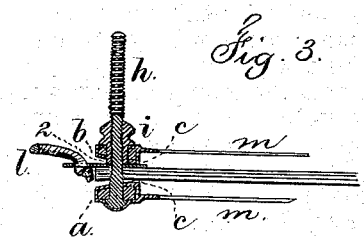
Witnesses:
Chas. H. Smith
Geo. T. Pinckney
Inventor
Lawson P. Keech
per Lemuel W. Serrell
Atty

UNITED STATES PATENT OFFICE.

LAWSON P. KEECH, OF BROOKLYN, NEW YORK.

IMPROVEMENT IN TEMPORARY BINDERS.

Specification forming part of Letters Patent No. 156,887, dated November 17, 1874; application filed January 20, 1874.

*To all whom it may concern:*

Be it known that I, LAWSON P. KEECH, of Brooklyn, in the county of Kings and State of New York, have invented an Improvement in Paper-Files, of which the following is a specification:

This paper-file is especially adapted to clamping newspapers, periodicals, pamphlets, music, or other papers within a cover in such a manner that perforations or notches are dispensed with.

I make use of two clamping-bars drawn together by nuts and screws, and said clamping-bars are beveled outwardly from the inner edges that press upon the papers, so that the clamping-force is at a distance of about half an inch from the back edges or folds of the sheets. Thereby the back itself can expand, and, occupying more space, will be retained firmly between the clamps.

In order to prevent the screws coming into contact with the wooden clamping-bars, and to retain those bars in a proper position relatively to each other, the nuts are made with cylindrical extensions passing through the holes in the clamping-bar.

In the drawing, Figure 1 is an elevation of the paper-file complete. Fig. 2 is a transverse section of the clamping-bars; and Fig. 3 is a section through one of the clamping-screws.

The bars $a$ and $b$ are of suitable size and length, and each bar is beveled upon one side so as to produce a clamping-edge at $c$, and these edges, coming opposite each other, bind the included sheets of paper at this line, and leave them free at the back edges or folds, thereby retaining them very firmly. The bars $a$ and $b$ are drawn toward each other by the clamping-screws $h$ and nuts $i$, said clamping-screws having heads at one end secured firmly to the clamping-bar $a$. These screws pass through the clamping-bars, and the holes in the bar $b$ are sufficiently large to allow the cylindrical portions 2 of the nuts $i$ to pass into them and prevent the bar tipping and insuring a proper position of said bar $b$, so that its clamping-edge $c$ may bear upon the paper to be clamped.

The covers $m$ may be connected to the respective clamping-bars $a$ $b$.

By this construction sheets, pamphlets, &c., may be firmly clamped into place or easily loosened or removed.

The suspending-cord $l$ is connected at its ends by loops around the screws $h$, and at the said screws the faces of the bars $a$ $b$ are sufficiently removed to furnish room for the loops when the bars are clamped together.

I claim as my invention—

1. The clamping-bars $a$ $b$, beveled outwardly so as to clamp only at their inner edges, in combination with the screws $h$ and nuts $i$, substantially as set forth.

2. The nuts $i$, with the cylindrical extensions 2 passing through the holes in the bar $b$, in combination with the beveled bar $a$ and screws $h$ $h$ attached to the same, substantially as set forth.

Signed by me this 15th day of January, A. D. 1874.

LAWSON P. KEECH.

Witnesses:
 GEO. T. PINCKNEY,
 CHAS. H. SMITH.